US006539127B1

(12) United States Patent
Roche et al.

(10) Patent No.: US 6,539,127 B1
(45) Date of Patent: Mar. 25, 2003

(54) ELECTRONIC DEVICE FOR AUTOMATIC REGISTRATION OF IMAGES

(75) Inventors: Alexis Roche, Antibes (FR); Nicholas Ayache, Nice (FR); Gregoire Malandain, Antibes (FR); Xavier Pennec, Antibes (FR)

(73) Assignee: Inria Institut National de Recherche, Le Chesnay Cedex (FR)

( * ) Notice: Subject to any disclaimer, the term of this patent is extended or adjusted under 35 U.S.C. 154(b) by 0 days.

(21) Appl. No.: 09/361,313

(22) Filed: Jul. 27, 1999

(30) Foreign Application Priority Data

Jul. 28, 1998 (FR) .............................. 98 09649

(51) Int. Cl.⁷ ................................ G06K 9/32
(52) U.S. Cl. ...................... 382/294; 382/276
(58) Field of Search ............................ 382/154, 162, 382/128–134, 274, 151, 181, 254, 276, 278, 284, 289, 291, 294, 295, 296, 300; 348/42; 702/85, 150–154

(56) References Cited

U.S. PATENT DOCUMENTS

| 5,179,441 A | * | 1/1993 | Anderson et al. ............ 348/43 |
| 5,633,951 A | * | 5/1997 | Moshfeghi .................. 382/154 |
| 5,911,035 A | * | 6/1999 | Tsao ........................... 706/16 |
| 5,944,669 A | * | 8/1999 | Kaib ........................... 600/512 |
| 6,269,323 B1 | * | 7/2001 | Vapnik et al. ............... 702/154 |

FOREIGN PATENT DOCUMENTS

| GB | 1 437 161 | 5/1976 |
| WO | WO 97/41532 | 11/1997 |

OTHER PUBLICATIONS

Mort, M.S. et al. "Maximum Likelihood Image Registration with Subpixel Accuracy"; *Applications of Digital Image Processing XI*; Aug. 15–17, 1988; vol. 974 pp. 38–45.
Herbin M. et al. "Automatic Registration of CT and MR Brain Images Using Correlation of Geometrical Features" *IEEE Transactions on Medical Imaging*; Jun. 14, 1995 No. 2; pp 384–396.
Woods, R.P. et al.; "MRI–Pet Registration with Automated Algorithm"; *Journal of Computer Assisted Tomography*; Jul.–Aug. 1993; pp 536–546.
Herbin M. et al.; "Automated Registration of Dissimilar Images: Application to Medical Imagery"; *Computer Vision, Graphics, and Image Processing*; Jul. 1989. No. 1; pp 77–88.
Maes, F. et al.; "Multimodality Image Registration by Maximization of Mutual Information"; *IEEE Transactions on Medical Imaging*; Apr. 2, 1997; vol. 16, pp. 187–198.
Viola P. et al.; "Alignment by Maximization of Mutual Information" *International Journal of Computer Vision*; Sep. 2, 1997; vol. 24; pp 137–154.
Buzug et al.; "Voxel–Based Similarity Measures for Medical Image Registration in Radiological Diagnosis and Image Guided Surgery"; *Journal of Computing and Information Technology*; Jun. 1998; vol. 6, No. 2; pp 165–179.

* cited by examiner

Primary Examiner—Bhavesh Mehta
Assistant Examiner—Kanji Patel
(74) Attorney, Agent, or Firm—Rabin & Berdo, P.C.

(57) ABSTRACT

An electronic data processing device receives first and second data sets representing first and second comparable digital images. It comprises registration means comprising a first module which calculates a main function representative of the correlation ratios between the data of the first and second sets, and a second module which determines a registration transformation between one of the images and the other from the main function.

24 Claims, 3 Drawing Sheets

ELECTRONIC DEVICE FOR AUTOMATIC REGISTRATION OF IMAGES

FIELD OF THE INVENTION

The invention relates to the field of the processing of pairs of "two-dimensional" (2D) or "three-dimensional" (3D) comparable digital images, and more particularly the registration of a first image with respect to a second image.

BACKGROUND TO THE INVENTION

The term registration is understood to mean determining, from data sets which represent the two comparable digital images, a transformation making it possible to go from one of them, termed the "reference" image, to the other, termed the "floating" image. Stated otherwise, it involves carrying out the "best possible" superposition of the structures contained in two comparable images.

Here, the word "comparable" should be understood within its widest acceptance. It therefore refers, in particular, to so-called "monomodal" images captured with the aid of the same acquisition technique, either over substantially identical regions of the same "object" at different instants, or over substantially identical regions of two distinct "objects". However it also refers to so-called "multimodal" images captured with the aid of two different acquisition techniques, either over substantially identical regions of the same "object" possibly at different instants, or over substantially identical regions of two distinct "objects".

PRIOR ART

A number of registration techniques are already known to the person skilled in the art. In particular, this is the case for certain so-called "oriented voxel" techniques which involve determining the registration transformation which maximizes a certain measure of similarity between the superposable voxels of two comparable images. A voxel is the smallest volume element (3D) or surface element (2D) of an image. In general, a datum, from the set of data of an image, is associated with each element (or voxel) making up this image. A datum comprises at least one position component making it possible to identify the corresponding element and one intensity component representing the value at this position of a chosen physical quantity.

Such oriented voxel techniques entail, for example, the WOODS criterion, or the VIOLA criterion, or else the so-called "mutual" information cue. These techniques are not entirely satisfactory, especially when they are used for the registration of multimodal images.

OBJECT OF THE INVENTION

It is a principal object of the present invention to provide an alternative to the aforementioned prior art techniques.

SUMMARY OF THE INVENTION

To this end it proposes an electronic image processing device furnished with a registration module comprising on the one hand a first module capable of calculating a main function representing the correlation ratios (as defined below) between the data of a first data set representative of a first image termed the reference image, and the data of a second data set representative of a second image termed the floating image, and on the other hand a second module having the function of determining a registration transformation making it possible to superimpose the floating image onto the reference image on the basis of the main function calculated by the first module.

The expression "function representative of the correlation ratios" is understood to mean the function from probability theory, which is not usually symmetric, and which for a first data set measures its degree of resemblance to a second data set, independently of the intensity levels of one of the two data sets. With the aim of simplifying the language, in the following description the main function will be regarded as the correlation ratio. Of course, whenever the value of the correlation ratio is to be designated rather than the function which it represents, mention will be made of this.

Moreover, the correlation ratio (in the guise of a function) should be understood both in its conventional acceptance, that is to say accompanied by a Euclidean norm referred to as "order 2", and in a very general acceptance in which it is accompanied either by a non-Euclidean norm of any order different from 2, or by any quadratic form of order 2.

In a particularly advantageous embodiment, the registration module is furnished with a third module so as to estimate a joint probability density function (or two-dimensional histogram), representative of the intensity of the second (floating) image as a function of the intensity of the first (reference) image, from the first and second data sets, the first module then being arranged so as to calculate the correlation ratio from this joint probability density function (JPDF). This arrangement makes it possible to ease the calculation of the correlation ratio.

According to another characteristic of the invention, mechanical or electronic means are provided which make it possible to designate, out of the two images, the one which serves as reference image (first image) and the one which serves as "floating" image (second image), given that the floating image is the one which is to be registered with regard to the reference image by the registration transformation to be determined.

In a variant, intended to ease the determination of the correlation ratio (in the guise of a function), there is provided a fourth module for transforming the first or the second data set (reference set or floating set) into a third data set comprising data whose position components correspond to each of the position components of the data of the second set (floating set) or of the first set (reference set), respectively. The intensity components of the third and second (or first) sets may thus be compared directly at each voxel, given that the associated position components correspond. According to the variants, the fourth module directly feeds either the first module for the calculation of the correlation ratio, or the third module for the calculation of the joint probability density function.

Advantageously, the transformation of the first (or second) data set into a third data set is performed by applying an initialization registration transformation followed by an interpolation, preferably of trilinear type, to the first (or second) set.

According to yet another characteristic of the invention, the second module determines the main function (correlation ratio) by selecting according to a chosen criterion a maximum of this function from among the maximum or maxima which it possesses, the registration transformation is then determined from this selected maximum.

The registration transformations are preferably chosen from among any n-dimensional geometric transformations, n being chosen at least from the values 2 and 3 according to the dimension of the images.

More preferably still, the registration transformation is determined within the class of affine n-dimensional transformations, and in particular those referred to as "rigid". However, it could also be determined from among the so-called "non-rigid" transformations, in particular.

In a particularly advantageous variant, the registration transformation is calculated iteratively. To do this, the second module is arranged so as to determine whether the registration transformation which has just been determined from the main function (correlation ratio), satisfies a chosen criterion. In the event of the non-satisfaction of this criterion, the registration transformation having just been checked is addressed to the fourth module with a view to replacing the transformation previously used for obtaining the third data set. A new correlation ratio is then recalculated, followed by a new registration transformation. This operation is then repeated until a registration transformation fulfils the satisfaction criterion, or else until the operation has been repeated a number of times equal to a predetermined value, possibly adaptable.

With the aim of simplifying the calculations, the correlation ratio may be estimated from part(s) of the first and/or second sets which satisfy a chosen criterion, for example of intensity or of belonging to a region.

The invention applies very particularly, although not exclusively, to medical digital images, and more particularly still to the images obtained by different acquisition techniques.

The invention also proposes a method of processing two data sets respectively representing first and second comparable digital images, and comprising a step of registering the second image with regard to the first image, subdivided into a first substep consisting in calculating a main function representative of the correlation ratios between the data of the first set and the data of the second set, and a second substep consisting in determining a registration transformation of one of the two images with regard to the other image from this calculated main function.

BRIEF DESCRIPTION OF THE DRAWINGS

Other objects and advantages of the invention will become apparent on examining the detailed description which follows, as well as the appended drawings in which.

Figure 1:
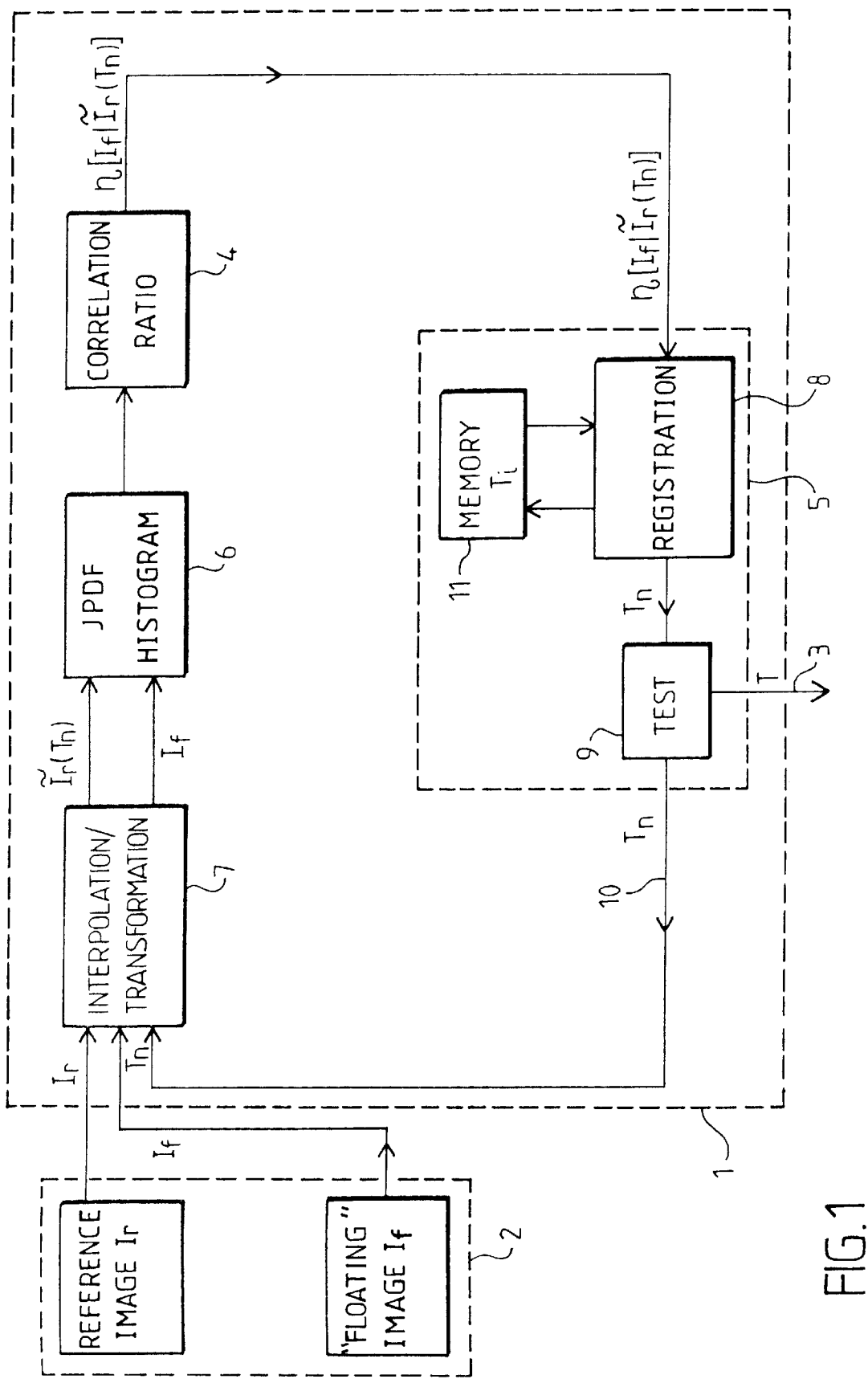
FIG. 1 schematically illustrates a preferred embodiment of the invention.

The drawings are, in essence, of definite character. Accordingly, they may not only serve to better elucidate the invention, but also to contribute to the definition thereof.

DETAILED DESCRIPTION OF THE PREFERRED EMBODIMENTS

Image registration is assuming an ever increasing importance in numerous fields now that these involve performing comparative analyses of images obtained either from different techniques, or from a single technique but at different instants.

In the following, reference will be made, by way of example, to a processing of comparable digital images from the medical field, such as those illustrated partially in the left parts of FIGS. 5A and 5B, which images have been obtained with regard to a brain of the same human subject.

In the medical field, a data set representing an n-dimensional (nD) image is obtained with the aid of apparatus such as X-ray scanners or nuclear magnetic resonance apparatus, or more generally any type of apparatus capable of acquiring images having intensity variation. Acquisition techniques commonly employed are known by the names magnetic resonance (MRI), computer-assisted tomography or scanning, and positron emission stomography (PET).

Each image is subdivided into elementary parts called voxels (or pixels when the image is only two-dimensional). A datum from a set of data representing an image Nd therefore comprises at least one position component representing n spatial coordinates with respect to a three-dimensional reference frame and one intensity component representing the value of the physical quantity measured at this position, generally lying between the values 0 and 1 or 1 and 256. The physical quantity measured obviously depends on the acquisition technique employed. In fact, to be more precise, the data of a set form an ordered list (or array), and the position of the datum in this list provides the position coordinates implicitly.

In the case of an MRI type acquisition technique, the 3D image acquired consists of a multiplicity of stacked 2D sections, in which the intensity variations represent the proton density of the issues.

The device according to the invention is adapted for processing pairs of such data sets representative of first and second images. It is more precisely adapted to the registration of the second image, termed the floating image If, with regard to the first image, termed the reference image Ir. This device generally forms part of a computer connected up to man/machine interface means and display means of the video monitor type allowing the viewing of the unprocessed and processed images.

The device according to the invention comprises a registration module 1 (illustrated partially and schematically in FIG. 1) which receives a first J1[I1] data set and a second J2[I2] data set, either directly, or by way of a designation module 2.

The purpose of this designation module is to designate one of the two images to be the "reference" image Ir, and the other image to be the "floating" image If; the floating image If being required to be registered with regard to the reference image Ir. Such a designation module can be managed either "mechanically" by an operator, for example via the man/machine interface, and in this case, the operator can himself designate the reference image and the floating image after having viewed the first and second images. However, it may also be "autonomous" if it comprises a decision submodule capable of comparing the first and second images according to a chosen criterion so as to designate the reference image and the floating image.

Of course, a variant of the device according to the invention may be envisaged in which the first and second images which feed the registration module 1 are directly and respectively the reference image Ir and the floating image If.

In what follows, the first image I1 will be regarded as the reference image Ir and the second image I2 as the floating image If.

The function of the registration module 1 is to determine a registration transformation T between the first and second images. This transformation makes it possible to obtain a superposition of the first and second images of an accuracy of up to a tenth of a volume element (or voxel). It may however be of any type, but preferably is of the so-called "rigid" type.

This registration module 1 comprises at least a first module for estimating a similarity function between the two images If and Ir, as well as a second module 5 more particularly intended for determining the registration transformation T which will make it possible to register the second image (or floating image) with regard to the first image (or reference image), and which is delivered on an output 3.

When the registration module 1 forms part of a computer, the output 3 generally feeds an analysis module making it possible, for example, to measure deformation fields from the registered images.

The similarity function, also called the main function, or correlation ratio (in the guise of a function), is hereinafter designated $\eta(\mathrm{If}/\mathrm{Ir}(T))$.

Preferably, although this is not obligatory, the first module 4 determines the correlation ratio $\eta$ from a two-dimensional joint histogram provided by a third module 6.

More precisely, a joint probability density function JPDF, or joint histogram, is determined, this being representative of the intensity of the second image as a function of the intensity of the first image, and then, from this JPDF, a histogram, which is interpreted as a marginal probability density function, is associated with each image.

This joint probability density function JPDF is determined from the first and second images, or more precisely, from the first J1[I1] and second J2[I2] data sets.

Accordingly, although this is not obligatory, there is provided in the registration module 1 a fourth module 7 intended for transforming the first data set J1 (representative of the reference image Ir) into a third data set J3[Ir(Tn)] which exhibits data whose position components are substantially identical to the position components of the data of the second data set J2 representative of the floating image If. Of course, the second data set could be transformed into the third data set, instead of the first data set.

In order to accelerate the calculation of the correlation ratio $\eta$, it is preferable to possess data sets which correspond positionally.

We start from the fact that the decomposition of each image into voxels can be performed in accordance with grids, for example regular grids. Stated otherwise, each grid represents a simple cubic mesh cell structure, the vertices of each mesh cell representing a voxel. Hence, this gives a first grid G1 for the reference image Ir and a second grid G2 for the floating image If. Of course, the grids could be of different configurations.

In general, the second grid of the floating image does not correspond to the first grid of the reference image. We shall therefore seek to pair up the two grids G1 and G2 according to a preferably affine transformation. In certain cases, we shall restrict ourselves to the so-called "rigid" affine transformations, these being compositions of a rotation and a translation.

Once the second grid G2 has been "paired" with regard to the first grid G1, the data of the first data set exhibit new position components (at least in respect of some of them), owing to the fact that they are measured in a reference frame tied to the floating image If and hence to the second grid G2. It is then necessary to determine the new intensity components of the data whose position components have been modified owing to the application of the transformation Tn.

To do this, an interpolation of trilinear type is preferably performed. When the values of the intensity components lie within the class which extends between the values 0 and 255, the interpolation may be followed by a rounding operation so that the value of the intensity interpolated at a given position component is rounded to the nearest integer. Moreover, and still preferably, the data (or voxels) of the first transformed grid which do not possess a chosen number, for example equal to 8, of neighbours in the second grid G2, are eliminated. The transformation followed by interpolation, and possibly operations for rounding and for eliminating particular voxels, applied to the first data set, provides the third data set J3 associated with the transformed image [Ir(Tn)].

In the example illustrated in FIG. 1, the fourth module 7 provides the third module 6 with the second J2[If] and third J3[Ir(Tn)], so that it determines the joint probability density function JPDF (or joint histogram). This function, and the mathematical route by which it may be obtained, are given in Appendix 1.

Figure 3:
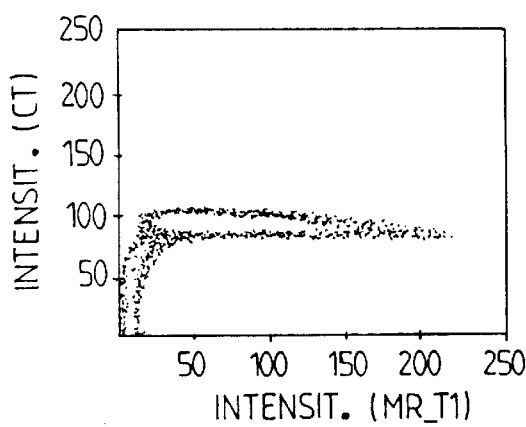
FIG. 3 illustrates a joint probability density function (JPDF) for images obtained respectively by magnetic resonance, a so-called MRI image, and by computer-assisted tomography or scanning.

An example of such a JPDF histogram is illustrated in FIG. 3, where the registered image (second image) has been obtained by scanning, whilst the reference image (first image) has been obtained with the aid of an MRI type technique.

With the formalism described earlier, the variable X or Y which represents the intensity component of each datum of a set of data is therefore regarded as a random variable. Stated otherwise, if a voxel (or a datum) of an image, for example the first I1, is picked at random, the probability of obtaining an intensity of value i is equal to the ratio of the number of voxels Ni of the first image (or number of data of the latter) possessing an intensity of value i to the total number N of voxels of this image ($N=\Sigma Ni$).

It should be pointed out here that this random character is artificial and should not be confused with the stochastic nature of a noise measurement.

The joint probability density function JPDF, estimated by the third module 6, is supplied to the first module 4 so that the latter determines the correlation ratio (in the guise of a function) $\eta$.

To determine a correlation ratio, such as it is defined in probability theory, it is first necessary to define the space in which this ratio will be calculated, as well as the associated norm.

The invention may be implemented in numerous types of spaces endowed with varied norms. Thus, it will be possible to employ the space $L^2(R)$ of square-summable real random variables. This space is a Hilbert space for the scalar product and possesses a Euclidean norm of standard type (referred to as order 2). However, it is also possible to work in a space $L^1(R)$ endowed with the standard 1 norm, or else in other classes endowed with a non-Euclidean norm of any order different from 2, or else again in spaces endowed with any quadratic form of order 2.

The mathematical definition of the correlation ratio η is given in Appendix 1, within the context of the space $L^2(R)$ of square-summable real random variables. To summarize, the correlation ratio is a function of two real random variables X and Y which, with this pair (X,Y) of random variables, associates a real value belonging to the closed class [0;1]. In so far as X and Y represent the intensity components of $\tilde{I}r(Tn)$ and If, this function measures the resemblance of the two "objects" represented by the reference image Ir and the floating image If, independently of the intensity levels of one of these two images, and preferably of the levels of the reference image Ir. Stated otherwise, this function (correlation ratio) makes it possible to quantify the degree of functional dependence between the two random variables which represent the intensity components of the first and second images.

The determined correlation ratio (in the guise of a function), η, provided by the first module 4 is then transmitted to the second module 5. In computer speak, we say that a pointer to the function η (correlation ratio) is sent to the second module 5.

The second module 5 comprises a calculation module 8 which determines the registration transformation T which maximizes the correlation ratio η. This may be reformulated in mathematical form: $T = \text{argmax} [\eta(Y_T/X)]$, where $Y_T$ and X denote the random variables associated with the images $\tilde{I}f(Tn)$ and Ir (in this example). argmax[f] denotes the class of values for which a function f is maximal.

Figure 4A:
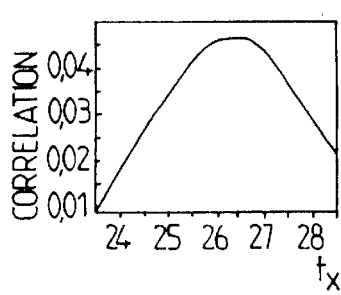
FIGS. 4A to 4C illustrate the correlation ratio, associated with the JPDF of FIG. 3, as a function of a translation within the neighbourhood of the standard golden transformation, with parameter tx equal to around 26.3 mm, respectively for subsamplings with ratios 2×2×1 (A), 8×8×1 (B) and 12×12×1 (C)

In so far as the function η may have several local maxima, including ones of the same value, the calculation module 8 is arranged so as to choose one of these maxima and associate the registration transformation with it. The process employed for choosing a maximum depends on the algorithm implemented by the calculation module 8. One criterion of choice may consist in comparing each maximum of η with a threshold value. Assuming that η exhibits only a single maximum, as illustrated in FIG. 4A (which illustrates the correlation ratio deduced from the joint probability density function, and illustrated in FIG. 3), the determination of the registration transformation T is particularly simple, and it is not really necessary to apply the criterion of choice to it.

Preferably, the registration transformation T is determined from among the three-dimensional rigid transformations which are well known to the person skilled in the art. However, it is clear that other types of transformations could be used to determine the registration transformation T, and in particular non-rigid transformations.

Likewise preferably, as illustrated in FIG. 1, the determination of the registration transformation is performed iteratively. This is because, when it is desired to obtain a highly accurate registration transformation, one is obliged to check whether the transformation Tn determined by the calculation module 8 exhibits the desired degree of accuracy, which may be fixed by the operator.

To do this, a test module 9 which subjects the transformation Tn to a test, by comparing it for example with a chosen stoppage criterion, is provided at the output of the calculation module 8. Such a criterion may pertain to the discrepancy in variation between two successive transformations Tn−1 and Tn, stoppage being decided when the discrepancy in variation is below a chosen threshold (so-called convergence criterion). Such a convergence criterion is usually incorporated, directly, into the optimization algorithm employed. Of course, other test criteria could be provided, such as for example a criterion pertaining to the degree of superposition of the floating image onto the reference image.

In the example illustrated in FIG. 1, the test module 9 has two outputs, one of which is the output 3 of the registration module 1, which delivers the "final" registration transformation T when Tn satisfies the chosen criterion, and one of which is an output 10 which is connected up to the fourth module 7 in such a way as to supply it with the registration transformation Tn when Tn does not satisfy the chosen criterion.

Stated otherwise, when the registration transformation Tn determined by the calculation module 8 is deemed to be of sufficient quality by the test module 9, the latter delivers the final registration transformation T on its output 3, whilst, when Tn is deemed to be of insufficient quality, the test module 9 transmits, via its output 10, the registration transformation Tn to the fourth module 7.

It is clear that, in the simplified variants of the invention which do not possess a fourth module and/or a third module, the registration transformation Tn is supplied directly to the first module 4, or to the third module 6.

The registration transformation Tn received (in this example) by the fourth module 7 then replaces the previous transformation which was stored in memory, and which had made it possible to determine the third data set $J3[\tilde{I}r(Tn)]$.

During the first processing of the data sets, the transformation T0 used by the fourth module 7 may be considered to be an initialization transformation. Of course, this embodiment relates only to the devices in which the registration module 1 performs an iterative processing, as illustrated in FIG. 1.

Furnished with this new transformation Tn (in the second iteration n=1), the fourth module 7 then determines a new third data set $J3[\tilde{I}r(Tn)]$ which it then transmits to the third module 6 (of course when the device has one) so that the joint probability density function JPDF is again calculated, then transmitted to the first module 4 with a view to the determination of a new correlation ratio η associated with the last transformation Tn calculated. This new correlation ratio is then supplied to the second module 5 so that its calculation module 8 determines a new registration transformation Tn (during the second iteration, n=2 at the output of the calculation module 8).

Preferably, the second module 5 comprises a memory 11 in which are stored (as and when they arise) all the registration transformations Ti (i=n) determined by the calculation module 8. In this way, the calculation module 8 can implement an optimization algorithm, for example of the Powell type, which is well known to the person skilled in the art. This Powell algorithm relies on a process of multidimensional direction sets, this being coupled with optimization of Brent lines of the type described in the publication by W. H. Press, B. P. Flannery, S. A. Teukolski and W. T. Vetterling, Numerical Recipes in C. Cambridge University Press, 2nd edition, 1992. Of course, other optimization algorithms may be used.

To determine the new registration transformation Tn, the calculation module 8 employs both the new correlation ratio η which has just been recalculated by the first module 4, and the previous registration transformations Ti stored in the memory 11. The new registration transformation Tn which results from this calculation is then transmitted to the test module 9 which decides, by applying the chosen criterion, either to deliver it on the output 3 in the form of the final registration transformation T, or to deliver it on the output 10 so that a new iteration may be performed. This mechanism can be repeated, either until a final registration transformation T is obtained which satisfies the chosen criterion, or until the number of iterations exceeds a predetermined threshold number, which may optionally be adapted by the operator.

Figure 2:
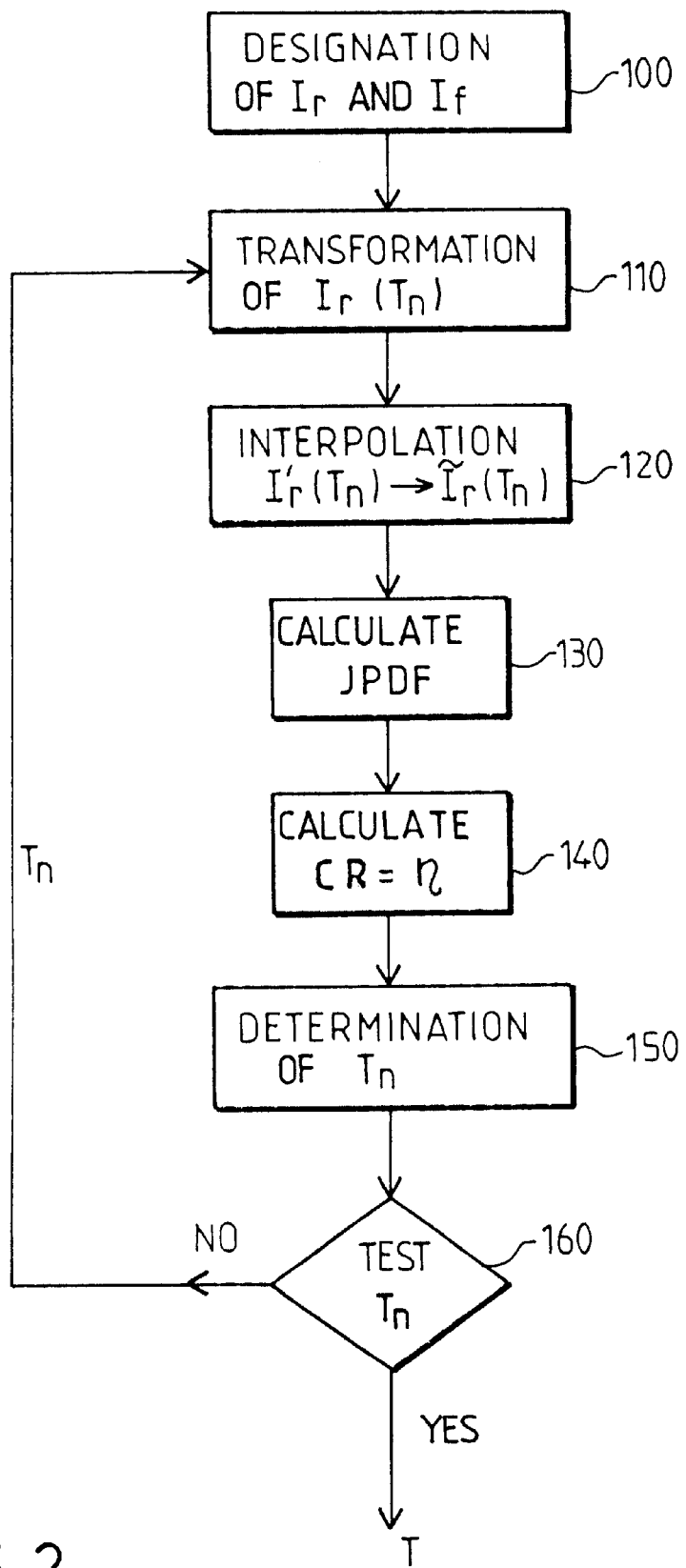
FIG. 2 is a block diagram illustrating the processing steps of a preferred method according to the invention.

The processing steps of a method according to the invention, which implements the iterative device having just been described, are illustrated in FIG. 2, in the form of a schematic block diagram.

The method according to the invention, illustrated in this FIG. 2, comprises a first step 100 in which the first image is designated as the reference image Ir and the second image as the floating image If. In a second step 110, transformation of the first data set representing the reference image Ir(Tn) is performed, so as to obtain a superposition of the position components of the data of the first data set onto the position components of the data of the second data set. Next, in a third step 120, an interpolation, preferably of the trilinear type, is performed on the transformed data of the first data set, so as to determine the new intensity components corresponding to the new position components of the first set J1. This provides a third data set J3[Ir(Tn)] associated with the first set J1.

Next, in a fourth step 130, a joint probability density function JPDF is determined from the second data set J2 and from the third data set J3[Ir(Tn)], so as to obtain a probabilistic representation of the reference image Ir (in fact Ir(Tn)) and floating image If.

Then, in a fifth step 140, a main function is calculated which is representative of the correlation ratios between the data of the first set J1 (in fact those of the third set J3) and the data of the second set J2.

In a sixth step 150, a registration transformation Tn is determined which is intended to allow the registration (or superposition) of the floating image If with regard to the reference image Ir.

Preferably, on exiting this sixth step, a test 160 is performed on the registration transformation Tn, so as to determine whether it exhibits a sufficient degree of quality. If the registration transformation Tn determined in step 150 satisfies the criterion applied to it during the test 160, then the said registration transformation Tn is considered to be the final registration transformation T, thereby bringing the method to an end. On the other hand, if the transformation Tn does not satisfy the criterion applied during the test 160, then the said registration transformation Tn is returned to the second step 110 where it replaces the preceding transformation, which had been applied to the reference image Ir represented by the first data set. Steps 110 to 160 are then repeated as often as necessary to obtain a final transformation T whose degree of quality is sufficient, or else as often as the method permits, when the latter comprises a chosen and optionally adaptable maximum number of iterations.

Of course, some of the steps of the method just described with reference to FIG. 2 are not necessary. Thus, it would be possible to go directly from step 100 to step 140, without performing any transformation of the first set, interpolation and calculation of the joint probability density function JPDF. Moreover, it would be possible to dispense with step 130 alone, whilst retaining steps 110 and 120.

The same holds in respect of the devices according to the invention, as has already been explained previously. It can in fact be demonstrated that it is possible to determine the correlation ratio (in the guise of a function) without needing previously to determine a joint histogram of the two images, reference and floating, (or JPDF). To do this, it is sufficient to rewrite the equations given in Appendix 1 in a local formalism, owing to the fact that the joint probability of the two images is defined by a simple normalization of their two-dimensional histogram. It is therefore possible to express a simple relation between the so-called marginal probability of the random variable representing the intensity components of the reference image and the Ni intensity components of the data representing the said reference image which exhibit the same intensity of value i. The details of this calculation are given in Appendix 2.

Moreover, with the aim of simplifying the calculations, and consequently the calculation times, it is possible to perform the determination of the registration transformation on the basis of some of the data of the sets of data for the reference and floating images. Stated otherwise, it is possible to preset certain data from the sets of data so that the processing is applied to these selected data alone, the other data not being considered to be relevant to the registration operation.

Figure 4B:
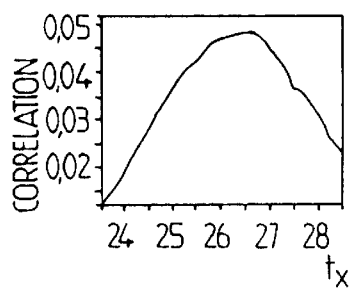
Figure 4C:
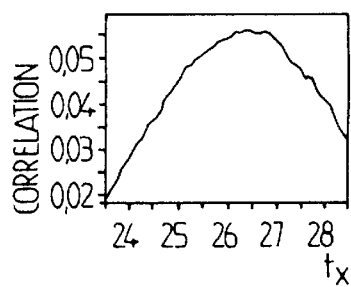

In FIGS. 4A to 4C are illustrated three examples of processing the data sets of the reference and floating images for three different data selections (also referred to as subsamplings). The correlation ratio illustrated in FIG. 4A was obtained from a subsampling of the second data set representing the floating image (obtained through a scan) by a factor 2×2×1. Stated otherwise, one datum out of two in the X direction and one datum out of two in the Y direction have been discarded.

FIGS. 4B and 4C respectively illustrate the correlation ratios for subsamplings of the data of the second set of a floating image (obtained by scanning) by factors 8×8×1, and 12×12×1, respectively.

Figure 5A:
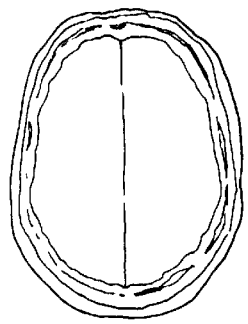
FIGS. 5A and 5B respectively illustrate, in their left part two scan images registered with regard to comparable MRI images of a brain, and in their right part the two MRI brain images onto which contours of the registered scan images of the left part have been superimposed; these images corresponding substantially to the JPDF function and to the correlation ratios illustrated in FIGS. 3 and 4 respectively.
Figure 5A:
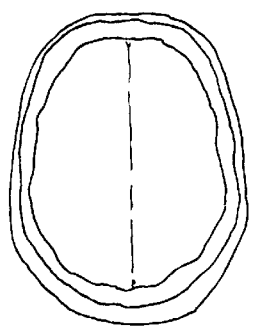
Figure 5A:
Figure 5B:
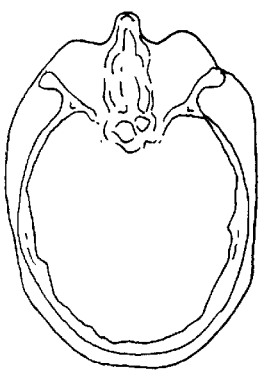
Figure 5B:
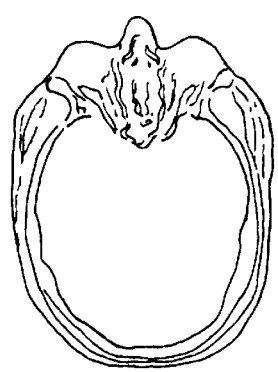
Figure 5B:

Two examples of image registration (obtained by scanning) are illustrated in FIGS. 5A and 5B, the left parts of these figures representing the registered image (scan), whilst the right parts of these figures represent the MRI type reference images onto which the contours of the relevant parts of the registered image (scan) have been superimposed.

The device according to the invention can be installed in a memory, for example a mass memory, of one or more calculation means of the work station and/or computer type, in the form of software modules.

For all useful purposes, it is pointed out that more detailed descriptive elements are indicated in the publication "Multimodal Image Registration by Maximization of the Correlation Ratio", by A. Roche, G. Malandain, N. Ayache and X. Pennec, INRIA Research Report, which will be made public after the present Patent Application has been filed.

The invention is not limited to the embodiments described above, merely by way of example, but it encompasses all the variants which the person skilled in the art may envisage within the context of the claims below.

Thus, a device for processing 2D or 3D images has been described together with the associated method, which are intended for processing medical images in particular, and especially those of the brain. However, it is clear that the invention is not limited to this field alone. It applies also to other sectors of the medical field, as well as to non-medical fields in which the registration of images of 2D or 3D objects assumes particular interest.

Moreover, a mode of processing images has been described in which affine n-dimensional registration transformations, in particular of the rigid type, were used. However, the invention extends more generally to non-rigid registration transformations, in particular any n-dimensional geometric transformations, such as for example spline type transformations.

APPENDIX 1

Calculation of the Correlation Ratio

Let $L^2$ be the space of square-summable real variables:

$$E(X^2) = \int_\Omega X^2 dPr < \infty$$

where E denotes the "expectation" operator.

$L^2$ is a Hilbert space relative to the scalar product $<X,Y> = E(XY)$, and the following norm:

$$\|X\|_2 = \sqrt{E(X^2)}$$

corresponds to it, and may be rewritten:

$$\|X-E(X)\|_2 \sqrt{Var(X)} = StdDev(X)$$

where the operators Var and StdDev respectively denote the "variance" and the "standard" deviation.

By virtue of the Hilbertian structure of $L^2$, it is possible to define a notion of orthogonality between two variables X and Y:

$$X \perp Y \leftrightarrow E(XY) = 0$$

thus making it possible to demonstrate that:

$$X \text{ and } Y \text{ independent} \rightarrow X-E(X) \perp Y-E(Y)$$

It is then possible to determine the angle between two variables X and Y by virtue of the fundamental properties of the scalar product:

$$(X,Y) = \|X\|_2 \|Y\|_2 \cos \alpha$$

$L^2$ moreover contains the one-dimensional space $\Delta$ of deterministic variables, that is to say those which are constant within the state space $\Omega$. Hence, given a variable X, the expectation E may then be rewritten:

$$E(X) = \int_R x p(x) dx = (X, 1)$$

E(X) is therefore the orthogonal projection of X onto $\Delta$. E(X) may then be rewritten as follows:

$$E(X) = \arg \min_{C \in \Delta} \|X - C\|_2^2$$

With the aid of this formalism, it is possible to determine the functional dependency between two independent variables X and Y. Thus, in this case, the knowledge of an event X=x provides new information regarding Y, and each event X=x induces a conditional probability density function for Y:

$$p(y \mid x) = \frac{p(x, y)}{p(x)}$$

to this function there corresponds the a-posteriori expectation of Y:

$$\Phi^*(x) = E(Y \mid X=x) = \int y p(y \mid x) dy$$

we therefore have for each event X:

$$E(Y \mid X) = \Phi^*(X)$$

And it may be verified that $$E[E(Y \mid X)] = E(Y)$$

which means that $E(Y \mid X)$ is an X-dependent random variable which is closest to Y:

$$\Phi^* = \arg \min_\Phi \|Y - \Phi(X)\|_2$$

The geometrical interpretation of the conditional expectation is given below. Let $L_x$ be the subspace of each possible function $\Phi$ of X:

$$L_x = L^2 \cap \{\Phi(X) \rightarrow \Phi : R \rightarrow R\{$$

we therefore have:

$$Y - E(Y \mid X) \perp E(Y \mid X) - E(Y)$$

and by applying Pythagoras' theorem, we obtain the variance:

$$Var(Y) = \|Y - E(Y)\|_2^2$$
$$= \|E(Y \mid X) - E[E(Y \mid X)]\|_2^2 + \|Y - E(Y \mid X)\|_2^2$$
$$= \|E(Y \mid X) - E(Y)\|_2^2 + \int_R \int_R [y - \Phi^*(x)]^2 p(x, y) dx dy$$
$$= Var[E(Y \mid X)] + \int_R \left( \int_R [y - \Phi^*(x)]^2 p(y \mid x) dy \right) p(x) dx$$

If we put:

$$Var(Y \mid X = x) = \int_R [y - \Phi^*(x)]^2 p(y \mid x) dx$$

and $E_x$, the operator defined by $$\forall \psi: R \rightarrow R, \ E_x(\psi) = \int_R \psi(x) p(x) dx$$

we can then rewrite the variance as:

$$Var(Y) = Var[E(Y \mid X)] + E_x[Var(Y \mid X=x)]$$

The correlation ratio is defined by the ratio:

$$\eta(Y \mid X) = \frac{Var[E(Y \mid X)]}{Var(Y)}$$

which may be rewritten:

$$1 - \eta(Y \mid X) = \frac{E_x[Var(Y \mid X = x)]}{Var(Y)}$$

If we now consider two variables X and $Y_T$ representing two images to be registered one with regard to the other, T being a given transformation making it possible to go from the image Y to the image X, the correlation ratio η for the transformation T is therefore given by the equation:

$$1 - \eta(Y_T \mid X) = \frac{E_x[Var(Y_T \mid X = x)]}{Var(Y_T)}$$

which may be rewritten:

$$1 - \eta(Y_T \mid X) = \frac{1}{\sigma^2} \sum_i \sigma_i^2 P_{x,T}(i)$$

where:

$$\sigma^2 = \sum_j j^2 P_{y,T}(i) - m^2$$

$$\sigma_i^2 = \frac{1}{P_{X,T}(i)} \sum_j j^2 P_T(i,j) - m_i^2$$

$$m = \sum_j j P_{y,T}(j)$$

$$m_i = \frac{1}{P_x(i)} = \sum_j P_T(i,j)$$

Here $P_T$ is the joint probability density of the two variables X and $Y_T$, and $P_{X,T}$ and $P_{Y,T}$ are the marginal probability densities of the said variables.

APPENDIX 2

So-called "Local" Probabilistic Approach

Let X and Y be two images and let P(i,j) be the joint probability of X and Y. Then the marginal probabilities of X ($P_x(i)$) and of Y ($P_y(j)$) are given respectively by:

$$\forall i, P_x(i) = \sum_j P(i,j)$$

and $$\forall j, P_y(j) = \sum_i P(i,j)$$

The conditional probability of Y knowing X is then given by:

$$P(j \mid i) = \frac{P(i,j)}{P_x(i)}$$

Starting from the definition of the correlation ratio given in Appendix 1:

$$\eta(Y \mid X) = 1 - \frac{E_x[Var(Y \mid X)]}{Var(Y)}$$

we can rewrite it:

$$\eta(Y \mid X) = \frac{1}{\sigma^2} \sum_i \sigma_i^2 P_x(i)$$

with:

$$\sigma^2 = \sum_j j^2 P_y(j) - m^2$$

$$m = \sum_j j P_y(j)$$

$$\sigma_i^2 \sum_j j^2 P(j \mid i) - m_i^2$$

$$m_i = \sum_{jj} P(j \mid i)$$

$\sigma^2$ and m are respectively the variance and the mean of the image Y.

Let Ω be the region common to the two images X and Y, N the total number of voxels (with coordinates ω) contained in this region, and $S_i$ the iso-density class of X corresponding to an intensity i and $N_i$ its cardinality, we then have:

$$S_i = \{\omega, X(\omega) = i\}, N_i = \text{card } S_i$$

The $S_i$ values then form a partition of Ω and hence:

$$\sum_i N_i = N$$

We can then reexpress the marginal probability of x as a function of the $N_i$:

$$P_x(i) = \frac{N_i}{N}$$

From this we then deduce the variance and mean:

$$\sigma^2 = \frac{1}{N} \sum_{\omega \in \Omega} (Y(\omega))^2 - m^2, \; m = \frac{1}{N} \sum_{\omega \in \Omega} Y(\omega)$$

Given an intensity level i in the image X, the conditional moments of Y given X=i are therefore the moments of the restriction of Y to the subclass $S_i$. The conditional variances and means can then be rewritten in a similar manner to the total moments:

$$\sigma_i^2 = \frac{1}{N_i} \sum_{\omega \in S_i} (Y(\omega))^2 - m_i^2, \; m_i = \frac{1}{N_i} \sum_{\omega \in S_i} Y(\omega)$$

thereby making it possible to determine the correlation ratio η.

We claim:

1. An electronic data processing device, comprising:
   a receiving means for receiving first and second data sets representing first and second comparable digital images, each datum of said sets comprising a position component and an intensity component;
   a registration means for determining, from these two data sets, a registration transformation between one of the images and the other; and
   an output means for outputting the registration transformation;
   wherein the registration means includes:
   (a) a first module able to calculate a main function representative of the correlation ratios between the data of the first set and the data of the second set; and (b) a second module able to determine the registration transformation from said main function.

2. A device according to claim 1, wherein the calculation of the main function is performed in a space having a chosen norm.

3. A device according to claim 2, wherein the space is a Hilbert space.

4. A device according to claim 1, further comprising:
a means for allowing the designation of said first image as "reference" image, and of said second image as "floating" image, so that the registration transformation is determined for registering the floating image with regard to the reference image.

5. A device according to claim 1, wherein the second module is arranged so as to choose a maximum value of the main function according to a chosen criterion and to determine the registration transformation from the maximum value.

6. A device according to claim 1, wherein the registration transformation is determined within a class of arbitrary n-dimensional geometric transformations, n being chosen at least from the values 2 and 3 according to the dimension of the images.

7. A device according to claim 6, wherein the n-dimensional geometric transformations are determined within a class of affine n-dimensional transformations referred to as "rigid".

8. A device according to claim 1, wherein the registration means is arranged so as to estimate the main function from the data of the first and second data sets satisfying a chosen criterion.

9. A device according to claim 1, wherein the comparable digital images are medical images.

10. A device according to claim 1, wherein the first and the second image originate from different acquisition techniques.

11. An electronic data processing device, comprising:
a receiving means for receiving first and second data sets representing first and second comparable digital images, each datum of said sets comprising a position component and an intensity component;
a registration means for determining, from these two data sets, a registration transformation between one of the images and the other; and
an output means for outputting the registration transformation;
wherein the registration means includes:
(a) a first module able to calculate a main function representative of the correlation ratios between the data of the first set and the data of the second set;
(b) a second module able to determine the registration transformation from said main function; and
(c) a third module able to estimate a joint probability density function from the first and second data sets; and wherein the first module is arranged so as to calculate the main function from the joint probability density function.

12. A device according to claim 11, wherein the calculation of the joint probability density function pertains to the intensity components of the data of the data sets.

13. A device according to claim 11, further comprising;
a fourth module arranged so as to transform the first data set into a third data set comprising data whose position components correspond to each of the position components of the data of the second data set.

14. A device according to claim 13, wherein the transformation of the first data set comprises the application of an initialization registration transformation and an interpolation.

15. A device according to claim 14, wherein the interpolation is of a trilinear type.

16. A device according to claim 14, wherein the registration means further includes a third module able to estimate a joint probability density function from the first and second data sets; and the first module is arranged so as to calculate the main function from the joint probability density function; wherein the second module is arranged so as to determine whether the registration transformation satisfies a chosen criterion; and wherein in the event of non-satisfaction of the criterion the registration transformation is addressed to the third module in such a way as to replace the transformation previously used for obtaining the third data set with a view to a new registration transformation determination.

17. A device according to claim 11, wherein the calculation of the main function is performed in a space having a chosen norm.

18. A device according to claim 17, wherein the space is a Hilbert space.

19. A device according to claim 11, further comprising:
a means for allowing the designation of said first image as "reference" image, and of said second image as "floating" image, so that the registration transformation is determined for registering the floating image with regard to the reference image.

20. A device according to claim 11, wherein the registration transformation is determined within a class of arbitrary n-dimensional geometric transformations, n being chosen at least from the values 2 and 3 according to the dimension of the images.

21. A device according to claim 20, wherein the n-dimensional geometric transformations are determined within a class of affine n-dimensional transformations referred to as "rigid".

22. A device according to claim 11, wherein the comparable digital images are medical images.

23. A device according to claim 11, wherein the first and the second image originate from different acquisition techniques.

24. A method of processing two data sets respectively representing first and second comparable digital images, each datum of said sets comprising a position component and an intensity component, said method comprising:
receiving the two data sets;
determining a registration transformation between one of the first and second images and the other, from the two data sets; and
outputting the registration transformation;
wherein the determining step includes the following sub-steps:
a) estimating a joint probability density function from the data of the first set and of the second set;
b) calculating from the joint probability density function a main function representative of the correlation ratios between the data of the first set and of the second set, and
c) determining the registration transformation from the calculated main function.

* * * * *